(12) United States Patent
Björklund et al.

(10) Patent No.: US 11,319,603 B2
(45) Date of Patent: May 3, 2022

(54) METHOD AND SYSTEM FOR PROCESSING LIGNOCELLULOSE MATERIAL

(71) Applicant: VALMET AB, Sundsvall (SE)

(72) Inventors: Peter Björklund, Umeå (SE); Mattias Erixon, Härnösand (SE); Francois Lambert, Sundsvall (SE); Andreas Averheim, Sundsvall (SE)

(73) Assignee: VALMET AB, Sundsvall (SE)

( * ) Notice: Subject to any disclaimer, the term of this patent is extended or adjusted under 35 U.S.C. 154(b) by 0 days.

(21) Appl. No.: 16/762,570

(22) PCT Filed: Sep. 21, 2018

(86) PCT No.: PCT/SE2018/050963
§ 371 (c)(1),
(2) Date: May 8, 2020

(87) PCT Pub. No.: WO2019/093938
PCT Pub. Date: May 16, 2019

(65) Prior Publication Data
US 2020/0332375 A1    Oct. 22, 2020

(30) Foreign Application Priority Data
Nov. 9, 2017 (SE) .................................... 1751388-8

(51) Int. Cl.
*C13K 13/00* (2006.01)
*C10L 5/44* (2006.01)
(Continued)

(52) U.S. Cl.
CPC ................. *C13K 13/00* (2013.01); *B01J 6/00* (2013.01); *C10L 5/06* (2013.01); *C10L 5/361* (2013.01);
(Continued)

(58) Field of Classification Search
CPC . B01J 6/00; C10L 2200/0469; C10L 2290/02; C10L 2290/06; C10L 2290/10;
(Continued)

(56) References Cited

U.S. PATENT DOCUMENTS

| 1,922,313 | A | 8/1933 | Mason |
| 7,303,707 | B2 | 12/2007 | Rafferty |

(Continued)

FOREIGN PATENT DOCUMENTS

| EP | 2 500 466 B1 | 9/2012 |
| JP | 2009-120746 A | 6/2009 |

(Continued)

*Primary Examiner* — Ellen M McAvoy
*Assistant Examiner* — Chantel L Graham
(74) *Attorney, Agent, or Firm* — Foley & Lardner LLP (57) ABSTRACT

A method for processing lignocellulose materials comprising the steps of hydrothermal treatment of the material with saturated or superheated steam in a hydrothermal pressure vessel, wherein the steam is provided by means of a steam boiler. The treatment is performed at a pressure of 5-30 bars, and at a temperature of 160-240° C. for a duration of 1-20 minutes. The method further comprises discharging hydrothermally treated lignocellulose material and steam from the pressure vessel by means of rapid pressure reduction, separating the steam and vapours released from the lignocellulose material, and burning the vapours together with additional fuel and combustion air in the furnace of said steam boiler. Furthermore, a corresponding system is provided.

10 Claims, 4 Drawing Sheets

(51) Int. Cl.
  *C10L 5/06*  (2006.01)
  *B01J 6/00*  (2006.01)
  *C10L 5/36*  (2006.01)
  *C10L 9/08*  (2006.01)

(52) U.S. Cl.
  CPC .............. *C10L 5/363* (2013.01); *C10L 5/44* (2013.01); *C10L 9/086* (2013.01); *C10L 2200/0469* (2013.01); *C10L 2290/02* (2013.01); *C10L 2290/06* (2013.01); *C10L 2290/10* (2013.01); *C10L 2290/148* (2013.01); *C10L 2290/30* (2013.01)

(58) Field of Classification Search
  CPC ......... C10L 2290/143; C10L 2290/148; C10L 2290/30; C10L 2290/54; C10L 5/06; C10L 5/361; C10L 5/363; C10L 5/44; C10L 5/442; C10L 9/086; C13K 13/00; D21B 1/36; Y02E 50/10; Y02E 50/30
  See application file for complete search history.

(56) References Cited

U.S. PATENT DOCUMENTS

| | | |
|---|---|---|
| 2012/0085023 A1 | 4/2012 | Teal et al. |
| 2014/0283439 A1* | 9/2014 | Hitchingham ............. C10J 3/62 44/505 |
| 2016/0002555 A1 | 1/2016 | Brusletto et al. |
| 2020/0017788 A1 | 1/2020 | Endo et al. |

FOREIGN PATENT DOCUMENTS

| | | |
|---|---|---|
| WO | WO 2014/129910 A1 | 8/2014 |
| WO | WO 2017/089648 A1 | 6/2017 |
| WO | WO 2018/096663 A1 | 5/2018 |

* cited by examiner

METHOD AND SYSTEM FOR PROCESSING LIGNOCELLULOSE MATERIAL

TECHNICAL FIELD

The invention relates to a method and a system for processing lignocellulose material. Even more specifically, our invention concerns improvements in such a method and system for reducing emission of environmentally harmful substances whereas the energy efficiency of the process is simultaneously improved.

BACKGROUND

Methods for hydrothermal treatment of lignocellulose biomass with steam explosion discharge are known in the art, for example from U.S. Pat. Nos. 1,922,313 and 7,303,707. Such hydrothermal treatment is performed at elevated pressure and temperature by contacting steam with the lignocellulose material such that the temperature is increased to a target level. Wet (or dried) lignocellulosic material is charged to a pressure vessel. Steam, which may also be superheated, is added to the reactor for heating of biomass to saturation temperature by direct condensation. The pressure level of the reactor or pressure vessel may be in the range 5-30 bar and the retention time about 1-20 minutes. The reactor can be designed for continuous or batch operation. During heating of a lignocellulose material, mainly hemicellulose compounds are hydrolysed to monomers and the molecular weight of lignin is decreased due to breaking of β-aryl ether bonds. The hot and softened biomass is discharged (blown) from the reactor through a blow valve or an orifice and it cools rapidly when moisture evaporates as pressure drops substantially to ambient. The expanding steam partly breaks the structure of the biomass which is also origin of the wording "steam explosion".

As said above, the hydrothermal treatment will result in chemical changes and decomposition of the main components, hemicellulose, cellulose, lignin and extractives, of the lignocellulose material. In a typical temperature operating window of 160-240° C., mainly hemicellulose is influenced. The acetyl groups of hemicellulose are hydrolysed to acetic acid and the sugars to their monomer building blocks. Hemicellulose comprise various sugars, the pentoses of which hydrolyse to pentosans. Pentosans may further undergo dehydration reactions forming furfural. Other main decomposition reaction products from lignin and hemicellulose are methanol and formic acid but numerous other hydrocarbons are formed as well in low concentrations. Practically all hydrocarbons formed are present both in the liquid and the vapour phases. The extractive compounds of the lignocellulose, for example terpenes, are as well present in both phases.

A blow steam, comprising aforementioned hydrocarbons, is released when the pressure vessel (i.e. the hydrothermal treatment vessel) is discharged through said blow valve or orifice. The blow steam typically comprises more than 90% (water) steam and remainder being the hydrocarbons and a small amount of carbon oxides and methane. Such blow steam cannot be released into the atmosphere due to environmental concerns.

One possible solution of eliminating emission of contaminated blow steam to the atmosphere at the same time recovering latent heat of condensation is simply to condense it with a heat-exchanger or scrubber followed by burning any un-condensed tail gas in a nearby boiler. However, a condensate rich in COD is produced with this solution. The COD rich condensate must be cleaned before it can be recovered or released to the environment. Anaerobic and/or aerobic waste water treatments systems are available and may be required, but they represent a capital-intensive solution which may deteriorate the economic feasibility of the lignocellulose treatment process. In some cases, these solutions may not be possible at all because of the requirement of large land areas for aerated basins.

Thus, there is a need for an improved method.

SUMMARY

An object of the invention is to provide a method and system for processing lignocellulose material which provides improved environmental performance and/or is more economical.

These and other objects are achieved by the present invention by means of a method and a system for processing lignocellulose materials.

According to a first aspect of the invention, there is provided a method for processing lignocellulose materials. The method comprises the steps of hydrothermal treatment of the material with saturated or superheated steam in a hydrothermal pressure vessel, wherein the saturated or superheated steam is provided from steam supplying means comprising a steam boiler. The treatment is performed for example at a pressure of 5-30 bars, and at a temperature of 160-240° C. for a duration of 1-20 minutes. The method further comprises discharging hydrothermally treated lignocellulose material and steam from the pressure vessel by means of rapid pressure reduction, separating the steam and vapours released from the lignocellulose material and burning the vapours together with additional fuel and combustion air in the furnace of said steam boiler. The method is preferably performed continuously, i.e. lignocellulose material and steam are continuously fed to the pressure vessel and the treated material is continuously discharged therefrom.

In other words, hydrothermally treated lignocellulose material and contaminated blow steam (constituted of the above-mentioned steam and vapours) is discharged from the pressure vessel by means of rapid pressure reduction (over a blow valve or orifice) to substantially atmospheric pressure. The discharge is followed by separation of the solid and gas phase, for example using one or more cyclones, such that the blow steam is separated from the hydrothermally treated material. The blow steam is thereafter burnt in the steam boiler together with fuel and combustion air provided to generate steam for the other process steps, particularly for the hydrothermal treatment step.

The invention is based on the insight that the environmentally harmful chemicals in the blow steam can be handled in an economic and effective manner by combusting them together with additional fuel and combustion air in the steam boiler. The additional investment in hardware is low since a steam boiler is required any way as part of a steam supplying means to provide steam to the hydrothermal treatment. The invention is furthermore based on the insight that the blow steam can be lead to and be combusted in the boiler despite its low calorific value. This is possible since the blow steam is already in the gas phase which means that sensible heat only is required for heating of the steam to the furnace temperature and further, the furnace of the steam boiler is already provided with additional fuel and combustion air to generate the desired quantities of steam. The invention is furthermore based on the insight that combustion of the organic matter contained in the blow steam also contribute with additional combustion heat to produce steam. It is understood that only organic matter released from the lignocellulose material is (partially or wholly) burned, whereas the steam portion of the blow steam passes through the steam boiler as an inert gas. Yet another insight of our invention is related to continuous operation mode of the hydrothermal treatment. Continuous operation of hydrothermal treatment results in a relatively small continuous flow of blow steam to combustion. This is a great advantage in comparison to a batch steam explosion process, which yields the blow steam in short and violent blow peaks which may be impossible or at least very difficult to handle in a combustion device. Adapting blow steam treatment to a batch type steam explosion process is discussed in US2016002555 which suggests installation of one or several heat exchangers designed for a very high heat load followed by an equalization vessel (gas holder) to control the flow of hydrocarbons to a suitable treatment system. Such a process concept may be very demanding with respect to the nature of the blow steam (condensate problems, corrosion problems and process control problems). In other words, a blow steam from continuous process is more readily adapted to combustion in a nearby boiler. A continuous process provides the best conditions for efficient and uninterrupted combustion of the blow steam.

The method further comprises recovering latent heat of condensation of the blow steam by leading flue gas from the steam boiler through a condensing flue gas cooler. It is understood that blow steam passes through the furnace together with combustion gases and increases the water dew-point of the flue gas. It is an insight of our invention, that the latent heat of condensation of the blow steam may be consequently largely recovered with a condensing flue gas cooler. Condensing flue gas coolers per se are known in the art and will not be described in further detail herein. The recovered (low grade) heat from the flue gas cooler is advantageously used for drying of the lignocellulose material prior to being supplied to said hydrothermal pressure vessel. Such drying may be achieved by using a low temperature belt dryer, where recovered heat may be used for heating of drying air. Other types of low temperature dryers are applicable as well, for example flash dryers.

In embodiments, the lignocellulose material fed to the hydrothermal pressure vessel has a moisture content of 0-30% on wet weight basis. Such moisture content may be achieved by means of a dryer as described above, or by other treatment steps prior to the hydrothermal treatment step. The moisture content is advantageously less than 10%, such as about 8%, before the hydrothermal treatment. This is advantageous since the hydrothermally treated material, after discharge and depressurization, may be dry enough for densification to for example pellets or briquettes, thereby reducing or eliminating the need for a drying step after the hydrothermal treatment.

In embodiments, the (saturated or superheated) steam is provided directly from the steam boiler as fresh steam, and the condensate formed during cooling of the flue gas is used as make-up water in the boiler's steam cycle. It is an insight of our invention that the condensate from the flue gas cooler is typically clean enough to be recovered to make-up water. The condensate may however in some cases need purification or cleaning. Such condensate recovery (comprising purification) may be achieved by processes known in the art, for example using nano-filtration or reverse osmosis type membrane-based cleaning devices. These embodiments are advantageous since the consumption of fresh make-up water to the boiler's steam cycle may be eliminated, or at least substantially reduced. Purification of the condensate results in a concentrate (concentrated contaminated condensate), but this is typically a very small volume in the form of a sludge or pressate. The pressate may be handled by adding it to the fuel to the steam boiler, such that the contaminants are burnt and ultimately end up in solid form with the bottom ash from the steam boiler. Alternatively, the pressate may be injected to the furnace with separate dedicated nozzle(s).

In embodiments, the steam supplying means further comprises a steam reboiler, and the method further comprises using the condensate formed during cooling of the flue gas as make-up water to the steam reboiler for production of steam to the hydrothermal pressure vessel using condensing fresh steam from the steam boiler as heating media. In other words, rather than using the purified condensate from the flue gas cooler as make-up water in the steam cycle of the boiler, it is boiled in a separate heat exchanger ("reboiler") using steam from the steam boiler as heating media. The condensate may be cleaned prior to being supplied to the reboiler in the same manner as described above. This embodiment is advantageous if the condensate from the flue gas cannot be purified to such an extent that it can be used directly in the steam cycle. This situation may happen in the case that the hydrothermal treatment process is adapted to a high-pressure steam boiler which may require a very clean make-up water.

In embodiments, the hydrothermally treated lignocellulose material is densified to form fuel pellets or briquettes. Thus, fuel pellets or briquettes may be produced in a more environmentally satisfactory and/or more economical manner than in the prior art. Methods for densifying the hydrothermally treated material to form pellets or briquettes are known in the art and will not be described in further detail herein. Depending on the moisture content prior to hydrothermal treatment, the material may require further drying prior to densification.

In embodiments, decomposition reactions of lignocellulose materials are intentionally catalysed by adding a mineral acid, for example sulfuric acid to the hydrothermal treatment process. The purpose of such catalysing is to release more sugars from carbohydrates for further processing to for example ethanol and biomaterial based chemicals. There will be a distribution of volatile hydrocarbons in condensed and vapour phases in this case as well.

According to a second aspect of the invention there is provided a system for processing lignocellulose material, which system comprises at least one pressure vessel, steam supplying means, discharge orifice(s) or blow valve(s) arranged at an outlet of each pressure vessel and separating means connected to the discharge orifice or blow valve. The at least one pressure vessel is adapted for hydrothermal treatment of the lignocellulose material. The steam supplying means comprises at least one steam boiler and is connected to at least one of the at least one pressure vessel to supply steam thereto. Each discharge orifice or blow valve is arranged at an outlet of a corresponding pressure vessel, said orifice or blow valve being adapted for rapid pressure reduction to atmospheric pressure. The separating means is connected to the discharge orifice or blow valve for separating blow steam (steam and vapours released from the lignocellulose material) from the solid material, the separating means further being connected to a furnace of the steam boiler to allow combustion of the blow steam with organic matter together with additional fuel and combustion air therein. The system further comprises at least one condensing flue gas cooler connected to the steam boiler to recover latent heat of condensation from the flue gas from the steam boiler.

The features of the embodiments described above are combinable in any practically realizable way to form embodiments having combinations of these features. Further, all features and advantages of embodiments described above relating to the method according to the first aspect of the invention may be applied in corresponding embodiments of the system according to the second aspect of the invention.

BRIEF DESCRIPTION OF THE DRAWINGS

Above discussed and other aspects of the present invention will now be described in more detail using the appended drawings, which show presently preferred embodiments of the invention, wherein.

DETAILED DESCRIPTION

Figure 1:
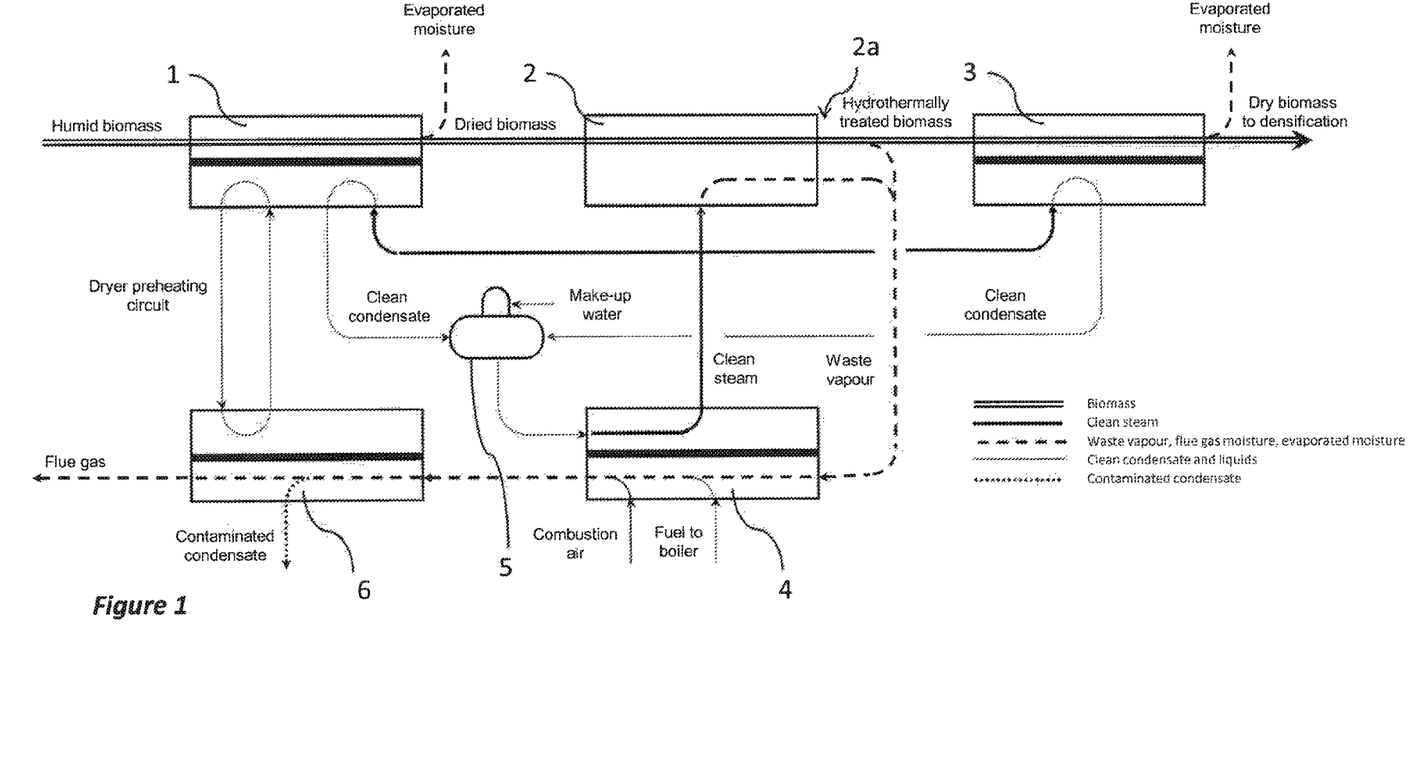
FIG. 1 is a schematic illustration of an embodiment of the system according to the second aspect of the invention.

FIG. 1 is a schematic illustration of an embodiment of the system according to the second aspect of the invention. In the upper left side of the figure, humid biomass (lignocellulose material) is provided at a particle size suitable for hydrothermal treatment in a pressure vessel. The humid biomass is dried to a desired moisture content, preferably between 0-30% by means of a pre-dryer 1 being a low temperature belt dryer, the drying air of which is heated in two steps, first in a pre-heating step driven by low temperature recycled heat (as described below), and a final (optional) heating step driven by steam from a steam boiler 4 (as described below). The dried biomass is conveyed to a pressure vessel 2 adapted for hydrothermal treatment of the biomass with saturated or superheated steam. The treatment is performed by contacting steam with pre-dried biomass at a pressure of 5-30 bars, and at a temperature of 160-240° C. for a duration of 1-20 minutes, wherein the steam is provided directly from the steam boiler 4 as shown in the figure. Thus, the steam supplying means solely comprises a steam boiler in this embodiment. The pressure vessel comprises a discharge orifice arranged at its outlet 2a. The discharge orifice is adapted for rapid pressure reduction to atmospheric pressure and may comprise a controllable aperture.

In embodiments, it is preferred to operate the hydrothermal treatment continuously. Consequently, the discharge through the blow valve or orifice is a continuous (uninterrupted) flow as well. The discharge flow is as normally a two-phase choked flow comprising a vapour (steam) phase and a solid phase (solid, moist and hot, hydrothermally treated lignocellulose material). Consequently, the blow steam to be treated, comprises both flash steam evaporated from the lignocellulose material and steam which passes the blow valve or orifice simultaneously with said lignocellulose material.

Separating means in the form of one or more cyclones (not shown in the figure) is connected to the discharge orifice for separation of the solid and gas phase such that blow steam resulting from the steam explosion treatment is separated from the hydrothermally treated biomass. The blow steam which is contaminated with hydrocarbons is thereafter led to the furnace of the steam boiler 4, such that the organic content of the same is at least partly combusted together with the fuel and combustion air provided to generate steam for the pre-dryer 1, the pressure vessel 2 and to the optional post-dryer 3.

In embodiments, an optional post-dryer 3, may be required if pre-drying 1 of lignocellulose material is not performed to such a low moisture that the resulting hydrothermally treated material, after de-pressurization, is dry enough for pelleting or briquetting. In such embodiments, the hydrothermally treated biomass is conveyed to the post-dryer 3, where after the biomass is ready for densification to for example pellets or briquettes. Clean condensates from the pre-dryer and the post-dryer are returned to a feed water tank 5, to which additional (clean) make-up water may also be added. Flue gas resulting from combustion of the fuel, combustion air and waste vapour is led to a condensing flue gas cooler 6 in which latent heat of condensation of the blow steam is recovered. The recovered heat (in the form of low temperature heat) is used for heating of drying air in the pre-dryer 1 as described above. The heat is transferred by means of an energy carrier recycle comprising water or water mixed with antifreeze, for example ethylene glycol. A by-product in the form of a contaminated condensate will result from the flue gas cooler. The flue gas cooler is preferably an indirect shell and tube heat exchanger in this embodiment but other types of indirect heat exchangers may be applicable as well. In other embodiments, the flue gas cooler may be a scrubber direct cooler furnished with a recycle loop comprising a recycle pipe, a recycle pump and a recycle cooler.

In other embodiments (not shown in the figure), recovered heat from the flue gas cooler may be used for post-drying purposes as well, in principle in the same manner as was explained for pre-drying.

Figure 2:
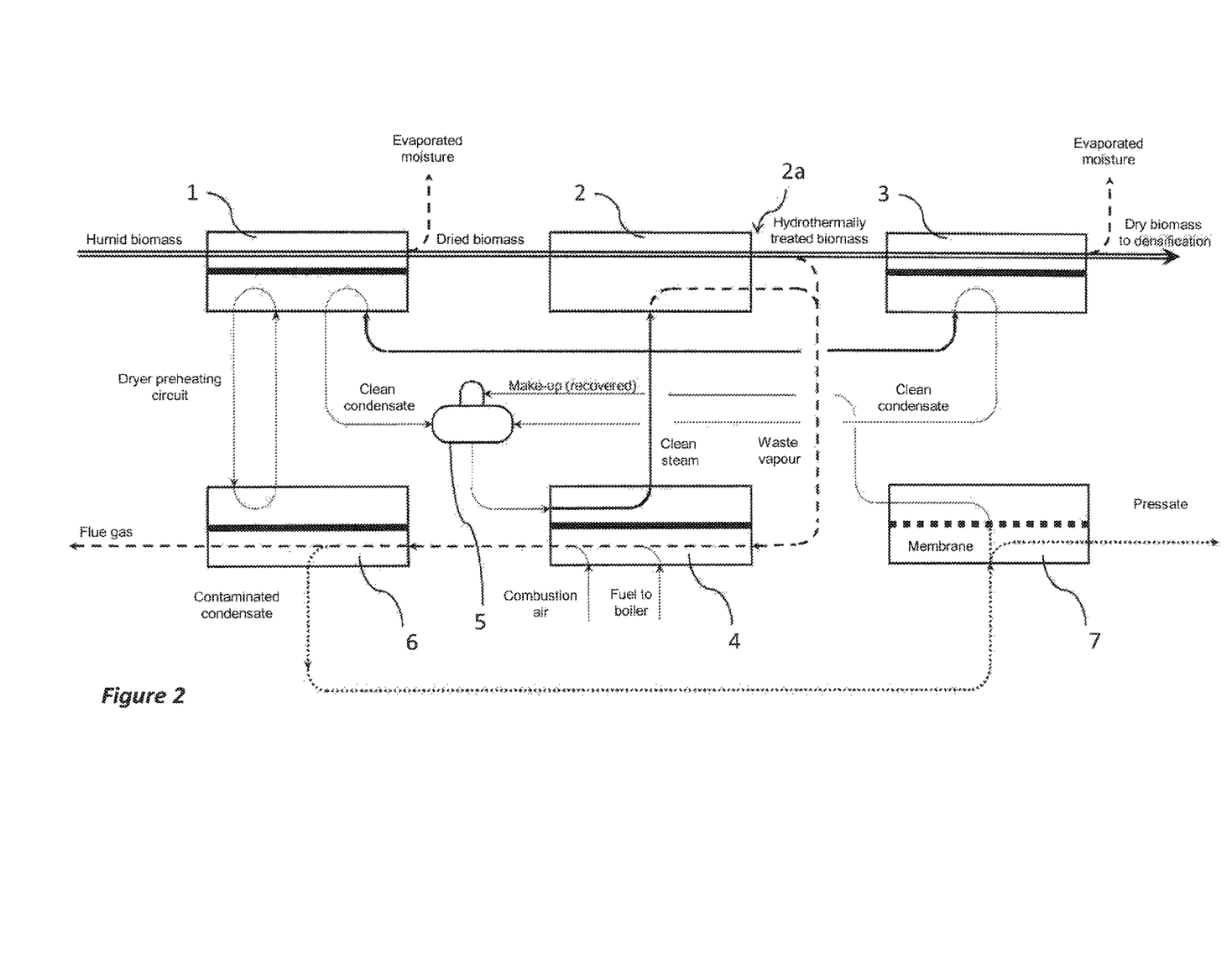
FIG. 2 is a schematic illustration of another embodiment of the system according to the second aspect of the invention.

FIG. 2 is a schematic illustration of another embodiment of the system according to the second aspect of the invention. This embodiment differs from the embodiment in FIG. 1 in that it further comprises a condensate purification device 7 which supplies the feed water tank 5 with purified condensate instead of fresh water. The contaminated condensate from the flue gas cooler 6 is led to the condensate purification device 7 which uses one or more membrane stages to separate contaminants from the condensate. The contaminants are removed from the purification device 7 with a pressate (concentrated contaminated condensate). The purified condensate is, as described above, led to the feed water tank and the pressate may be mixed in the fuel to the boiler and combusted.

Figure 3:
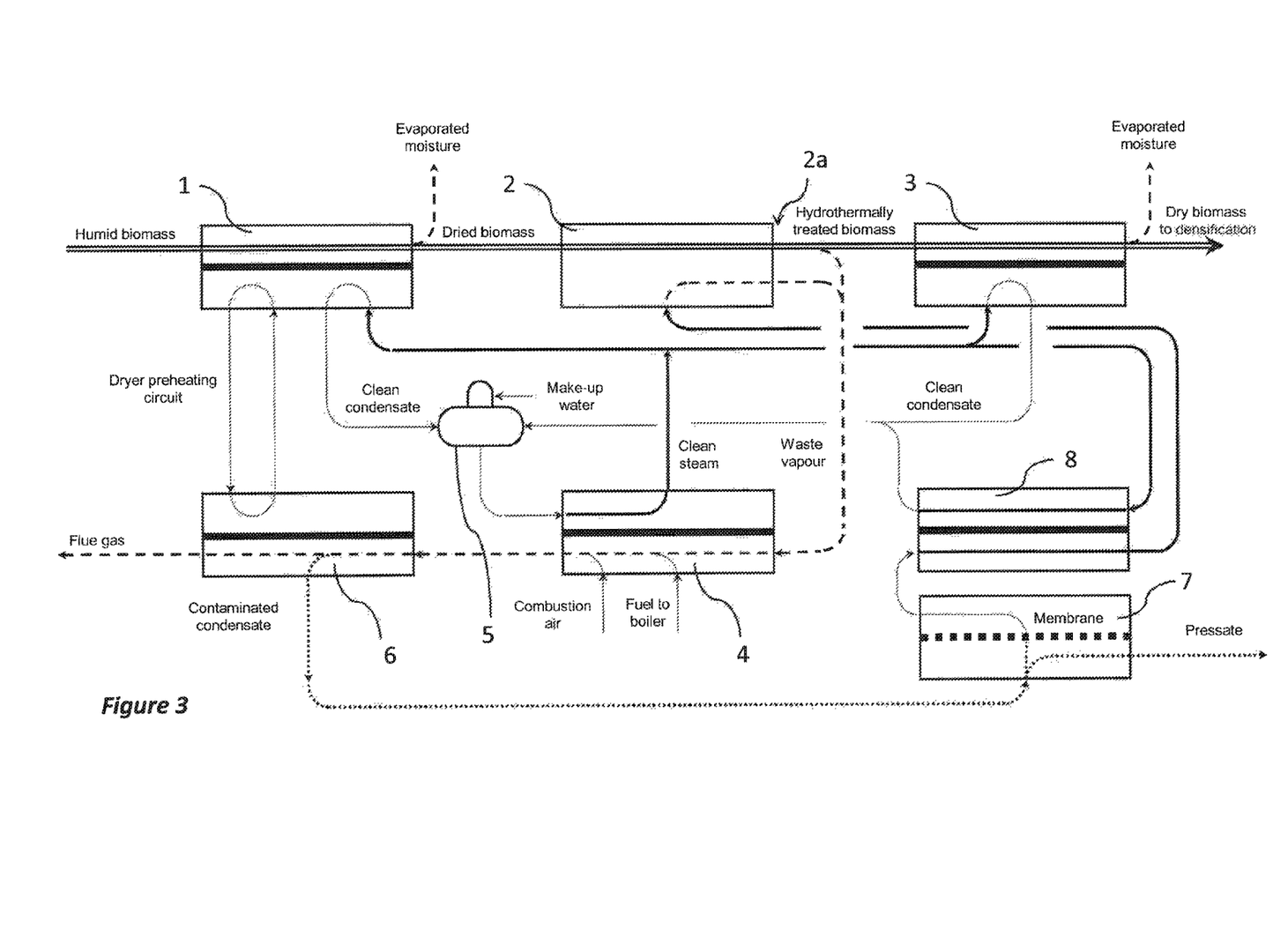
FIG. 3 is a schematic illustration of yet another embodiment of the system according to the second aspect of the invention.

FIG. 3 is a schematic illustration of another embodiment of the system according to the second aspect of the invention. This embodiment differs from the embodiment in FIG. 2 in that the steam supplying means further comprises a steam reboiler 8, and in that purified condensate is not added to the steam cycle, but is instead used as make-up water to the steam reboiler 8 for production of steam to the hydrothermal pressure vessel 2, which is thus not supplied with steam directly from the steam boiler 4. The steam reboiler 8, being for example a falling film indirect evaporator, is driven using condensing fresh steam from the boiler as heating media. The condensate is purified by a condensate purification device 7 prior to being supplied to the reboiler in the same manner as described in the embodiment above. Any contaminants remaining in the purified and thereafter boiled condensate is solely supplied to the hydrothermal pressure vessel 2, and is consequently released with the blow steam for combustion in the furnace of the steam boiler 4. Any contaminants remaining after combustion is returned to the condensate purification device 7 via the flue gas cooler 6.

Figure 4:
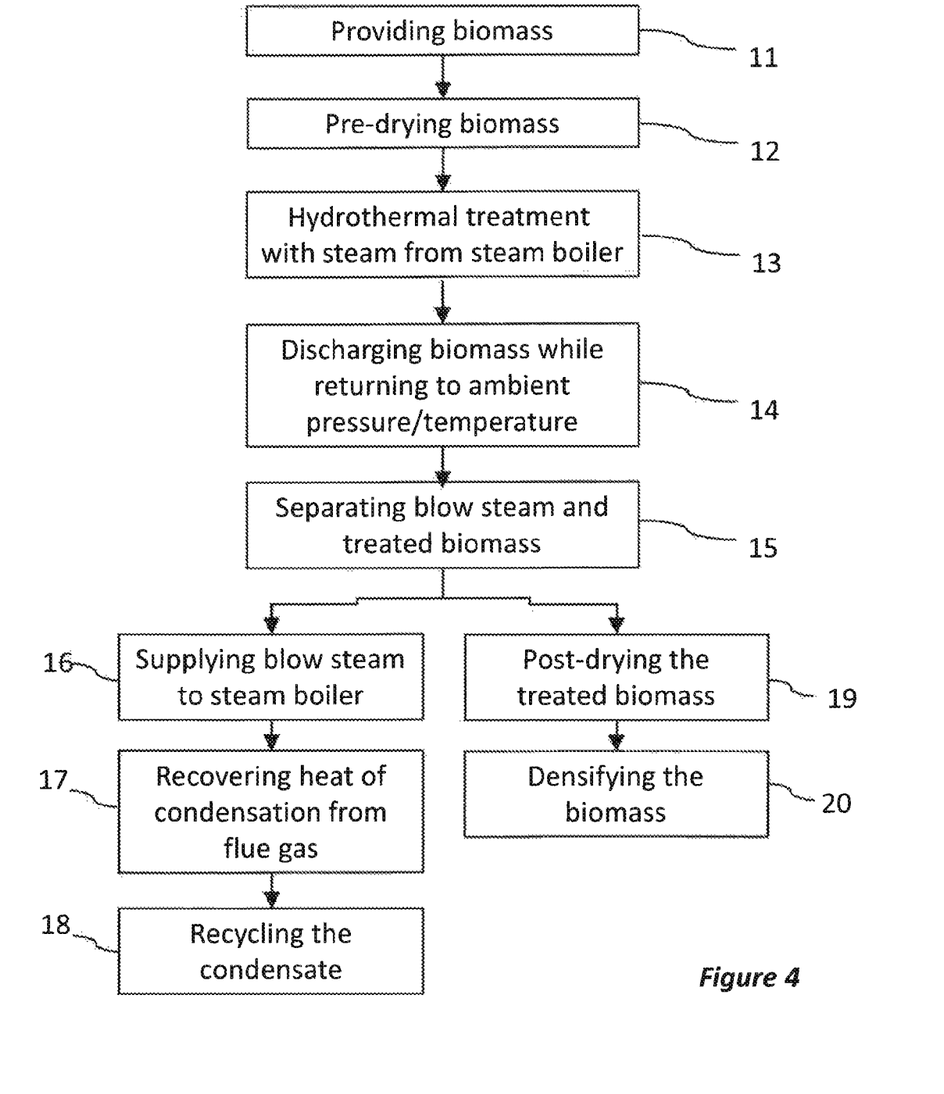
FIG. 4 is a block diagram which shows the steps of an embodiment of the method according to the first aspect of the invention.

FIG. 4 is a block diagram which schematically shows the steps of an embodiment of the method according to the first aspect of the invention. In the first step 11, humid biomass (lignocellulose material) is provided at a particle size suitable for hydrothermal treatment in a pressure vessel. In step 12, the humid biomass is dried to a desired moisture content, preferably between 0-30%, which is preferably at least partly driven by low temperature recycled heat from step 17 (as described below). In step 13, the biomass is hydrothermally treated with saturated or superheated steam. The treatment is performed at a pressure of 5-30 bars, and at a temperature of 160-240° C. for a duration of 1-20 minutes. The steam is provided from steam supplying means comprising at least one steam boiler and optionally a reboiler. After treatment, the biomass is discharged rapidly to atmospheric pressure (steam explosion discharge). After discharge, the solid and gas phases are separated 15 such that the blow steam resulting from the steam explosion treatment is separated from the hydrothermally treated biomass. In step 16, the blow steam is led to the furnace of the steam boiler, such that the organic matter released from the biomass is at least partly combusted together with the fuel and combustion air provided to generate steam for the hydrothermal treatment step 13 and the drying steps 12, 19.

Flue gas resulting from combustion of the fuel, combustion air and blow steam in the steam boiler is led to a condensing flue gas cooler in which latent heat of condensation of the blow steam is recovered (step 17). The recovered heat (in the form of low temperature heat) is used for heating of drying air to the pre-heater step 12. The (contaminated) condensate from step 17 is recycled 18 by being supplied as make-up water to the steam cycle. Step 18 optionally comprises cleaning the condensate prior to being supplied as make-up water. The hydrothermally treated biomass is optionally (depending on its moisture content) dried in step 19 and is finally densified to form for example fuel pellets or briquettes.

The description above and the appended drawings are to be considered as non-limiting examples of the invention. The person skilled in the art realizes that several changes and modifications may be made within the scope of the invention. The recovered heat from the flue gas may be used for other uses than drying of biomass, for example, the recovered heat from the condensing flue gas cooler could be utilized in lignocellulose based ethanol or biochemical plants which include a steam explosion pre-treatment step as described above or the recovered heat may be used in district heating system for heating of buildings. The scope of protection is determined by the appended patent claims.

The invention claimed is:

1. A method for processing lignocellulose material, comprising hydrothermal treatment of said material with saturated or superheated steam in a hydrothermal pressure vessel, wherein said treatment is performed continuously at a pressure of 5-30 bars, and at a temperature of 160-240° C. for a duration of 1-20 minutes, wherein said saturated or superheated steam is provided from a steam supplier comprising a steam boiler, said method further comprising:
   discharging hydrothermally treated lignocellulose material and steam from the hydrothermal pressure vessel by pressure reduction;
   separating steam and vapours released from said lignocellulose material;
   burning said vapours together with additional fuel and combustion air in a furnace of said steam boiler;
   recovering latent heat of condensation from flue gas from said steam boiler with a condensing flue gas cooler; and
   using the recovered heat from the flue gas cooler for drying of the lignocellulose material prior to being supplied to said hydrothermal pressure vessel,
   wherein the method is performed continuously in the hydrothermal pressure vessel,
   wherein the method is performed without a condenser arranged between the hydrothermal pressure vessel and the furnace of said steam boiler.

2. The method according to claim 1, further comprising providing said saturated or superheated steam directly from said steam boiler, and using the condensate formed during cooling of the flue gas as make-up water in the steam cycle.

3. The method according to claim 1, wherein said steam supplier further comprises a steam reboiler, and wherein said method further comprises using the condensate formed during cooling of the flue gas as make-up water to said steam reboiler for production of steam to the hydrothermal pressure vessel using condensing fresh steam from the steam boiler as heating media.

4. The method according to claim 2, wherein said condensate is cleaned prior to use as make-up water.

5. The method according to claim 1, wherein the dryness of the lignocellulose material fed to the hydrothermal pressure vessel is 0-30% on wet weight basis.

6. The method according to claim 1, wherein said separating is performed using at least one cyclone.

7. The method according to claim 1, further comprising the step of densifying of the hydrothermally treated lignocellulose material to form fuel pellets or briquettes.

8. The method according to claim 1, further comprising using the recovered heat from the flue gas cooler for drying of the lignocellulose material discharged from said hydrothermal pressure vessel.

9. A system for processing lignocellulose material, comprising
   at least one hydrothermal pressure vessel adapted for continuous hydrothermal treatment of said lignocellulose material;
   a steam supplier connected to at least one of said at least one hydrothermal pressure vessel to supply steam thereto, said steam supplier comprising at least one steam boiler;
   a discharge orifice or blow valve arranged at an outlet of each hydrothermal pressure vessel, said orifice or blow valve being adapted for pressure reduction to atmospheric pressure;
   a separator connected to the discharge orifice or blow valve adapted for separating steam and vapours from said lignocellulose material, said separator further being connected to a furnace of said steam boiler to allow combustion of said vapours together with additional fuel and combustion air therein;
   at least one flue gas cooler connected to the steam boiler to recover latent heat of condensation from flue gas from said steam boiler; and
   at least one pre-dryer connected to the at least one hydrothermal pressure vessel to dry the lignocellulose material prior to being supplied to said hydrothermal pressure vessel, wherein said at least one flue gas cooler is connected to said at least one pre-dryer to provide recovered heat thereto, wherein the system is configured to perform the processing continuously in the at least one hydrothermal pressure vessel, wherein the system is arranged without a condenser arranged between the at least one hydrothermal pressure vessel and the furnace of said steam boiler.

10. The method according to claim 3, wherein said condensate is cleaned prior to use as make-up water.

* * * * *